(12) United States Patent
Sunaga et al.

(10) Patent No.: US 6,661,134 B2
(45) Date of Patent: Dec. 9, 2003

(54) BRUSHLESS MOTOR

(75) Inventors: Hideki Sunaga, Gunma (JP); Shiro Nakamura, Tochigi (JP); Narihito Sano, Tochigi (JP); Takeshi Oba, Tochigi (JP); Eiji Takahashi, Tochigi (JP); Atsushi Takada, Tochigi (JP); Masami Kato, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/020,129

(22) Filed: Dec. 18, 2001

(65) Prior Publication Data

US 2002/0079755 A1 Jun. 27, 2002

(30) Foreign Application Priority Data

Dec. 18, 2000 (JP) ........................................ 2000-383933

(51) Int. Cl.⁷ ............................ H02K 11/00; H05K 7/20
(52) U.S. Cl. ...................... 310/64; 310/64; 310/68 R; 310/67 R; 310/71; 310/89
(58) Field of Search .................................. 310/64, 67 R, 310/68 R, 89, 91, 71, DIG. 6, 52, 58; 361/719, 718, 717, 220

(56) References Cited

U.S. PATENT DOCUMENTS 5,783,881 A  * 7/1998 Best et al. ..................... 310/91
6,208,052 B1 * 3/2001 Kershaw et al. .............. 310/91
6,297,572 B1 * 10/2001 Sunaga ...................... 310/68 R
6,370,026 B2 * 4/2002 Sunaga ........................ 381/719
6,417,590 B1 * 7/2002 Komura ..................... 310/90.5

FOREIGN PATENT DOCUMENTS

JP          2000-32729         1/2000

* cited by examiner

Primary Examiner—Nestor Ramirez
Assistant Examiner—Iraj A. Mohandesi
(74) Attorney, Agent, or Firm—Foley & Lardner

(57) ABSTRACT

A brushless motor for a blower fan unit is comprised of a heat sink which has a heat radiating portion and a pair of supporting legs extending from both opposite sides of the heat radiating portion. A free end portion of each supporting leg is in contact with an electric circuit board. A pressing member has a pressing portion, a pair of positioning portions perpendicularly extending from opposite end portions of the pressing portion, and a pair of connecting portions projecting from the pair of positioning portions respectively. The connecting portions are engaged with supporting legs of the heat sink respectively. The pressing portion presses switching devices to the heat sink. The positioning portions are inserted into the through-holes of the electric circuit board respectively.

19 Claims, 13 Drawing Sheets

BRUSHLESS MOTOR

BACKGROUND OF THE INVENTION

The present invention relates to a brushless motor such as a motor for a blower unit of an air conditioning system of automotive vehicles.

Japanese Patent Provisional Publication No. 2000-32729 discloses a brushless motor employed as a motor for a blower fan of an automotive air conditioner unit. Particularly, this disclosed brushless motor is arranged such that switching devices for switching directions of drive current supplied to exciting coils of a stator are fitted with a heat sink by means of elastic clips and are connected with an electric circuit board by means of soldering.

SUMMARY OF THE INVENTION

However, such a brushless motor has been required to be further improved in productivity.

It is therefore an object of the present invention to provide an improved brushless motor which performs high productivity and high reliability.

An aspect of the present invention resides in a brushless motor which comprises a stator, a rotor, an electric circuit board, a heat sink, a plurality of switching devices and a pressing member. The stator comprises a plurality of exciting coils, and the rotor is rotatable relative to the stator. The electric circuit board comprises a control circuit for controlling rotation of the rotor and through-holes. The heat sink comprises a heat radiating portion and a pair of supporting legs extending from opposite end portions of the heat radiating portion. The heat sink is disposed on the electric circuit board by contacting an end portion of each of the supporting legs with the electric circuit board. The switching devices are electrically connected with the electric circuit board and controls the direction of drive current supplied to exciting coils of a stator. The pressing member comprises a pressing portion, a pair of positioning portions extending from opposite end portions of the pressing portion, and a pair of connecting portions projecting from the pair of positioning portions respectively. The pressing portion presses the switching devices to the heat sink by engaging the connecting portions with the heat sink. The positioning portions are inserted into the through-holes of the electric circuit board respectively.

Another aspect of the present invention resides in an assembly structure of a brushless motor. The assembly structure comprises a circuit board, a heat sink, a plurality of switching devices and a pressing member. The circuit board comprises a control circuit for controlling a rotation of a rotor relative to a stator of the brushless motor. The heat sink comprises a heat radiating portion and a pair of supporting legs extending from both opposite sides of the heat radiating portion. A free end portion of each supporting leg is in contact with the electric circuit board. The switching devices are electrically connected with the electric circuit board and controls a direction of drive current supplied to exciting coils of the stator. The pressing member comprises a pressing portion, a pair of positioning portions perpendicularly extending from opposite end portions of the pressing portion, and a pair of connecting portions projecting from the pair of positioning portions respectively. The connecting portions are engaged with the supporting legs respectively. The pressing portion presses the switching devices to the heat sink. The positioning portions are inserted into the through-holes of the electric circuit board respectively.

The other objects and features of this invention will become understood from the following description with reference to the accompanying drawings.

DETAILED DESCRIPTION OF THE INVENTION

Referring to FIGS. 1 to 18, there is shown an embodiment of a brushless motor 1 which is employed in a blower unit of an air-conditioner unit for a vehicle.

Figure 1:
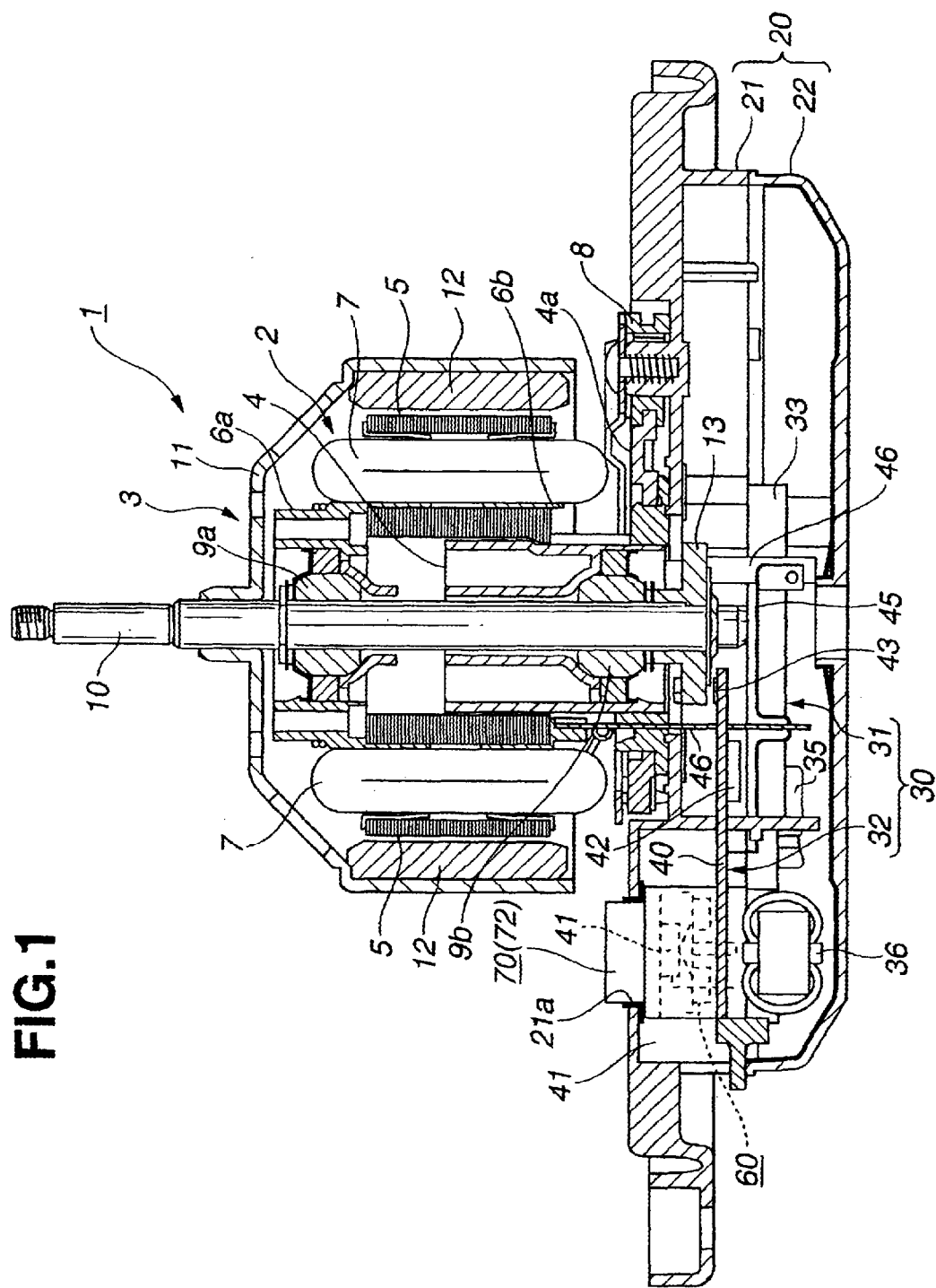
FIG. 1 is a cross sectional view showing a brushless motor of an embodiment according to the present invention.

As shown in FIG. 1, the brushless motor 1 is of a three-phase two-pole wire-wound type and comprises a stator 2 fixed to a circuit protecting case 20 and a rotor 3 rotatably supported by the stator 2.

The stator 2 comprises a housing 4 installed to the circuit protecting case 20, a core 5 fixed at an outer peripheral side of the housing 4, a pair of electric insulators 6a and 6b which are assembled with the core 5, and three exciting coils 7 which are wound around the core 5 through the electric insulators 6a and 6b.

The housing 4 is made of aluminum alloy and is formed into a column shape. A flange portion 4a projects outwardly from a lower end portion of the housing 4. The flange portion 4a is fixed to the circuit protection case 20 made of resin through a vibration proof rubber 8 by means of screws.

The core 5 is made by laminating a plurality of metal plates and is fixed to an outer peripheral portion of the housing 4. The three exciting coils 7 are wound around the core 5 through the pair of electric insulators 6a and 6b. The exciting coils 7 generate a magnetic field at the stator 2 when receiving drive current from a drive control circuit 30 provided in the circuit protection case 20.

The rotor 3 comprises a motor shaft 10 which is rotatably supported by the housing 4 through a pair of bearings 9a and 9b, a yoke 11 which is fixed at a tip end portion of the motor shaft 10 and four permanent magnets 12 which are attached on an inner periphery of the yoke 11.

A blower fan (not shown) of a blower unit for the air-conditioner unit is capable of being installed at a first end portion of the motor shaft 10. A main part of the motor shaft 10 penetrates the circuit protection case 30, and a sensor magnet 13 for detecting a rotational position of the rotor 3 is installed at a second end portion of the motor shaft 10. The sensor magnet 13 has four magnetized portions corresponding to the four permanent magnets 12. Each of the magnetized portions of the sensor magnet 13 has a polarity as same as that of the corresponding permanent magnet 12.

The yoke 11 is made of metal and is formed into a bowl shape. An end portion of the yoke 11, which portion corresponds to a bottom center portion of a bowl as shown in FIG. 1, is fixed to the motor shaft 10 so as to cover an outer periphery of the core 5. The four permanent magnets 12 are attached on the inner periphery of the yoke 11 so as to generate a rotational force to the rotor 3 due to the interaction between the magnetic field by the stator 2 and the magnetic field by the permanent magnets 12. The permanent magnets 12 are disposed opposite to the core 5 with a small clearance, and are arranged at predetermined equal intervals so as to alternatively (adjacently) locate a positive polarity magnet and a negative polarity magnet.

Figure 2:
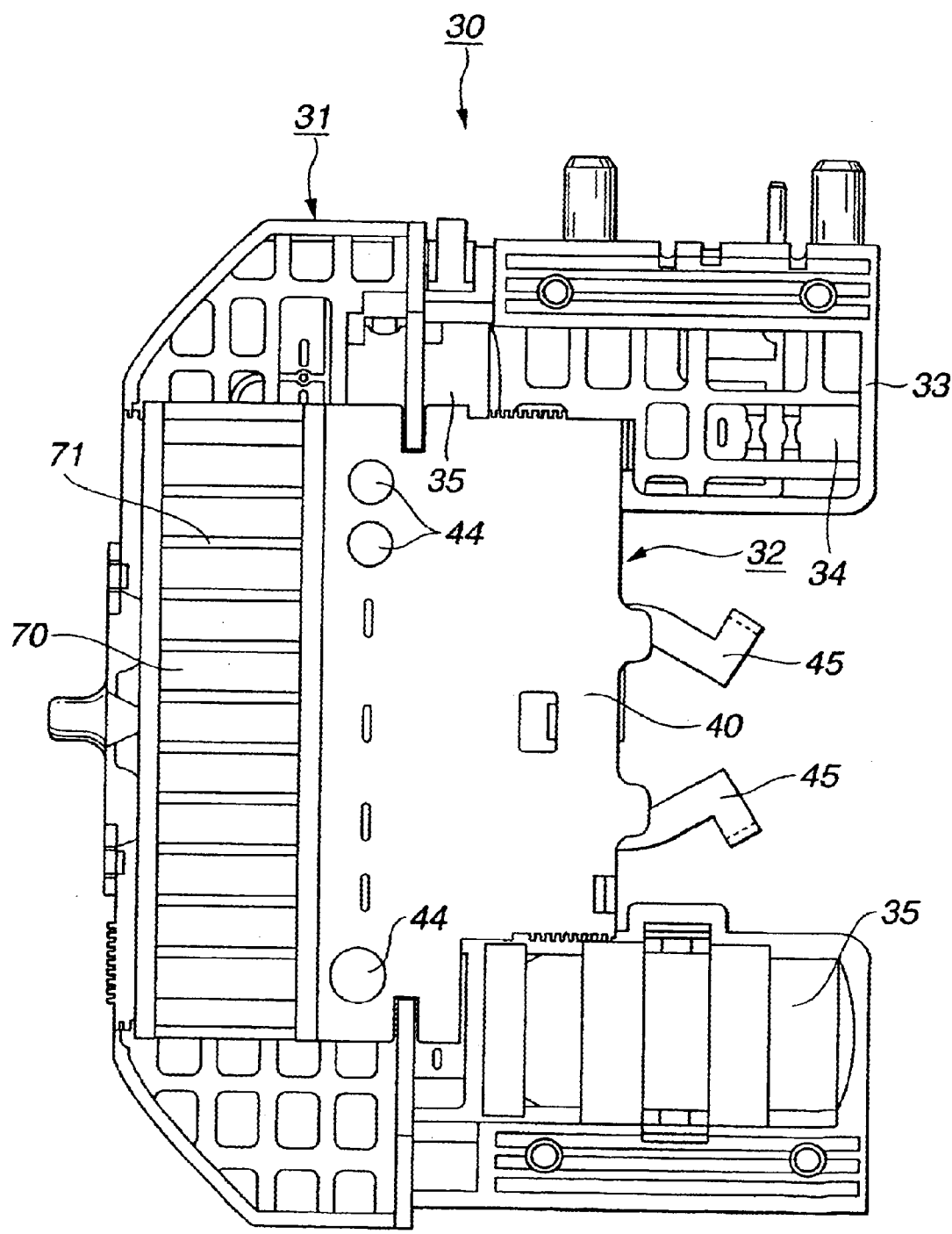
FIG. 2 is a plan view showing an upper side of a drive control circuit in the brushless motor of FIG. 1.
Figure 3:
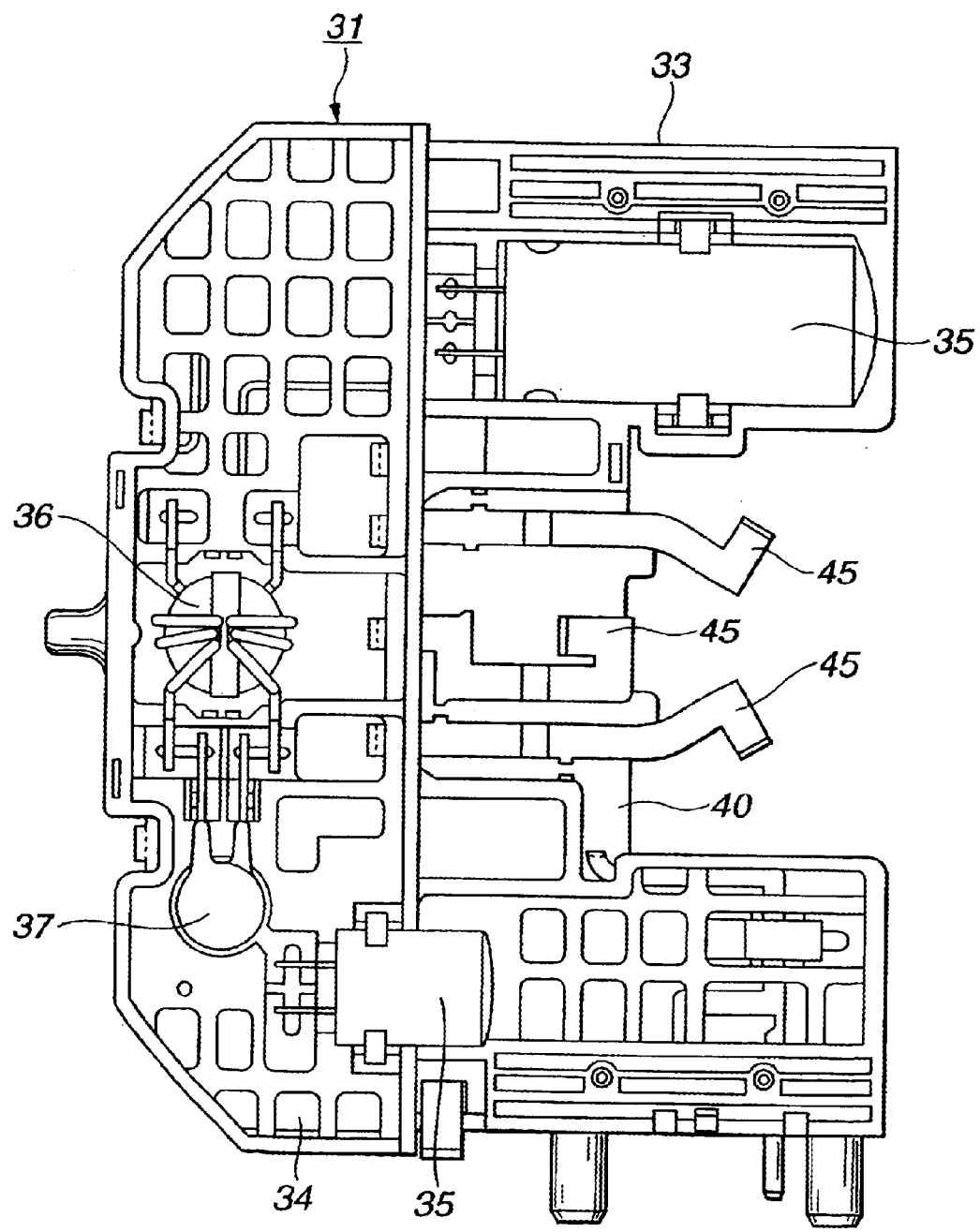
FIG. 3 is a plan view showing a lower side of the drive control circuit.

The circuit protection case 20 comprises a pair of an upper case 21 and a lower case 22. The drive control circuit 30, which supplies the drive current to the exciting coils 7 of the stator 2, is received in the circuit protection case 20. The drive control circuit 30 comprises a filter circuit 31 for eliminating surges of the supply electric power and a control circuit 32 for controlling the rotation of the rotor 3 by timely switching the direction of drive current supplied to the exciting coils 7 through the filter circuit 31. The filter circuit 31 of the drive control circuit 30 is provided in a resinous inner case 33 fixed in the circuit protection case 20, as shown in FIGS. 1 to 3. FIG. 2 is a plan view showing a top surface of the drive control circuit 30. FIG. 3 is a plan view showing a bottom view of the drive control circuit 30.

Bus bars 34 for wiring is produced by punching a sheet metal and are assembled into the inner case 33 by means of insert molding so as to form a wiring pattern. Further, various electric parts such as an electrolytic capacitor 35, a common mode choke coil 36 and a varistor (variable-resistor) 37 are installed to the inner case 33 and connected to the wiring pattern. The filter circuit 31 is constituted by the bus bars 34 and the electric parts installed in the inner case 33. The inner case 33 with the filter circuit 31 is fixed to an installation portion perpendicularly projecting from a top wall of the upper case 21 by means of screw so as to be located at a predetermined position in the circuit protection case 20.

On the other hand, the control circuit 32 of the drive control circuit 30 is for controlling the rotation of the rotor 3 and is provided on an electric circuit board 40 which is fixed inside the circuit protection case 20 so as to be located above the inner case 33. The electric circuit board 40 comprises a predetermined wiring pattern which is made by patterning. Further, installed to the electric circuit board 40 are electric parts, such as switching devices 41 for changing the direction of the drive current supplied to the exciting coils 7 of the stator 5 through the filter circuit 31, a control IC 42 for controlling switching timing of the respective switching devices 41, Hall effect devices 43 for detecting the rotational position of the rotor 3 in conjunction with the sensor magnet 13, and an electricity capacitor 44. The electric parts and a wiring pattern provided on the electric circuit board 40 constitute the control circuit 32.

The electric circuit board 40 with the control circuit 32 is disposed above the inner case 33 and is fixed to the upper case 21 through the inner case 33. A predetermined portion of the wiring bus bar 34 is bent upward and is soldered with a predetermined position of the electric circuit board 40, so that the filter circuit 31 and the control circuit 32 are electrically connected with each other. The filter circuit 31 is electrically connected with the exciting coils 7 of the stator 5 through terminal pins 46 which penetrates the bus bars 45 and the upper case 21 which are assembled with the inner case 33, so that the drive current is supplied from the drive control circuit 30 to the exciting coils 7.

The control circuit 32 detects the magnetic field generated by the sensor magnet 13 installed at the base end portion of the motor shaft 10 by means of the three Hall effect devices 43. The control circuit 32 consequently controls the rotation of the rotor 3 in a manner that the control IC 42 controls the switching timing of the switching devices 41 on the basis of the detection signal from the Hall effect devices 43. More specifically, the sensor magnet 13 has four magnetized regions in correspond to the arrangement of the four permanent magnets 14 of the rotor 4 so that the polarities of the four magnetized regions of the sensor magnet 13 are alternately changed in correspond to the polarities of the permanent magnets 12. Further, the sensor magnets 13 are rotated synchronously with the rotation of the rotor 3. Therefore, by detecting the magnetic field of the sensor magnet 13 by means of the Hall effect devices 43, the rotational position of the rotor 3 is detecting. The control circuit 32 properly controls the rotation of the rotor 3 by controlling the switching timing of the switching devices 41 by means of the control IC 42.

Herein, the detection signal supplied from each Hall effect device 43 to the control IC 42 generally takes a very small voltage value around 100 mv. Accordingly, the detection signal from each Hall effect device 43 tends to be influenced by disturbance radio waves. Therefore, it is very important to suppress the influence of the disturbance radio waves, in order to accurately control the rotation of the rotor 3.

In order to suppress the influence of the disturbance radio waves to the detection signal detected from the Hall effect device 43, it is preferable that a distance between the pair of wiring patterns for a plus side and a minus side is set short as possible. If the distance between the pair of wiring patterns is large and when disturbance radio waves are generated, noises overlapped on the signal become unequal between the plus side and the minus side. This unequal overlap of the noises to the plus and minus sides of the wiring patterns introduces the deviation of the zero-crossing point and appears as the detection error. Therefore, it is preferable that the distance between the pair of the wiring patterns of the plus and minus sides which connect the Hall effect devices 43 and the control IC 42, so that the noises overlapped on the signals due to the disturbance radio waves are equivalently applied to the plus side and the minus side of the wiring patterns, in order to suppress the detection error of the Hall effect devices 43 due to the disturbance radio waves.

Figure 4:
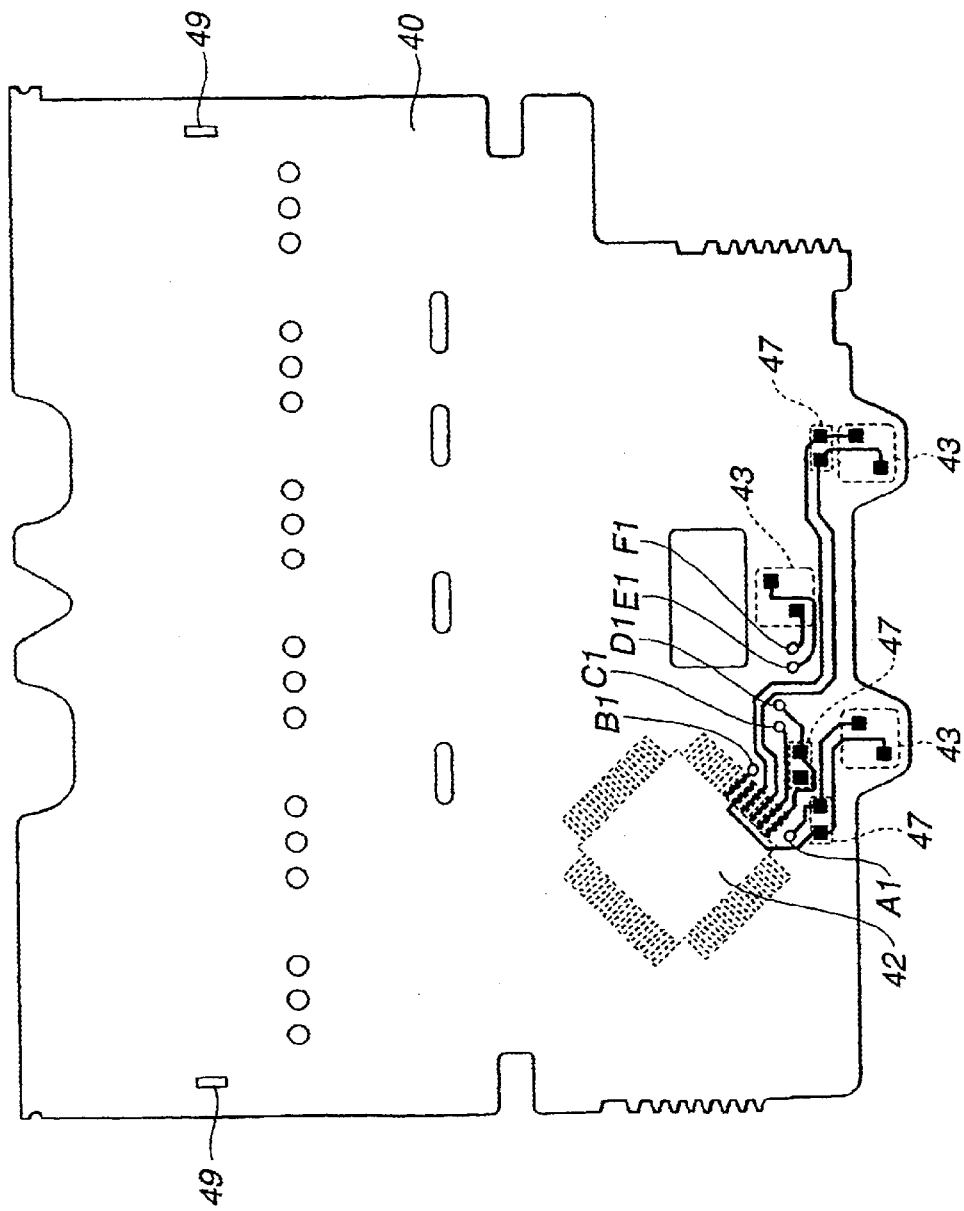
FIG. 4 is a plan view showing an upper side of an essential part of an electric circuit board employed in the brushless motor.
Figure 5:
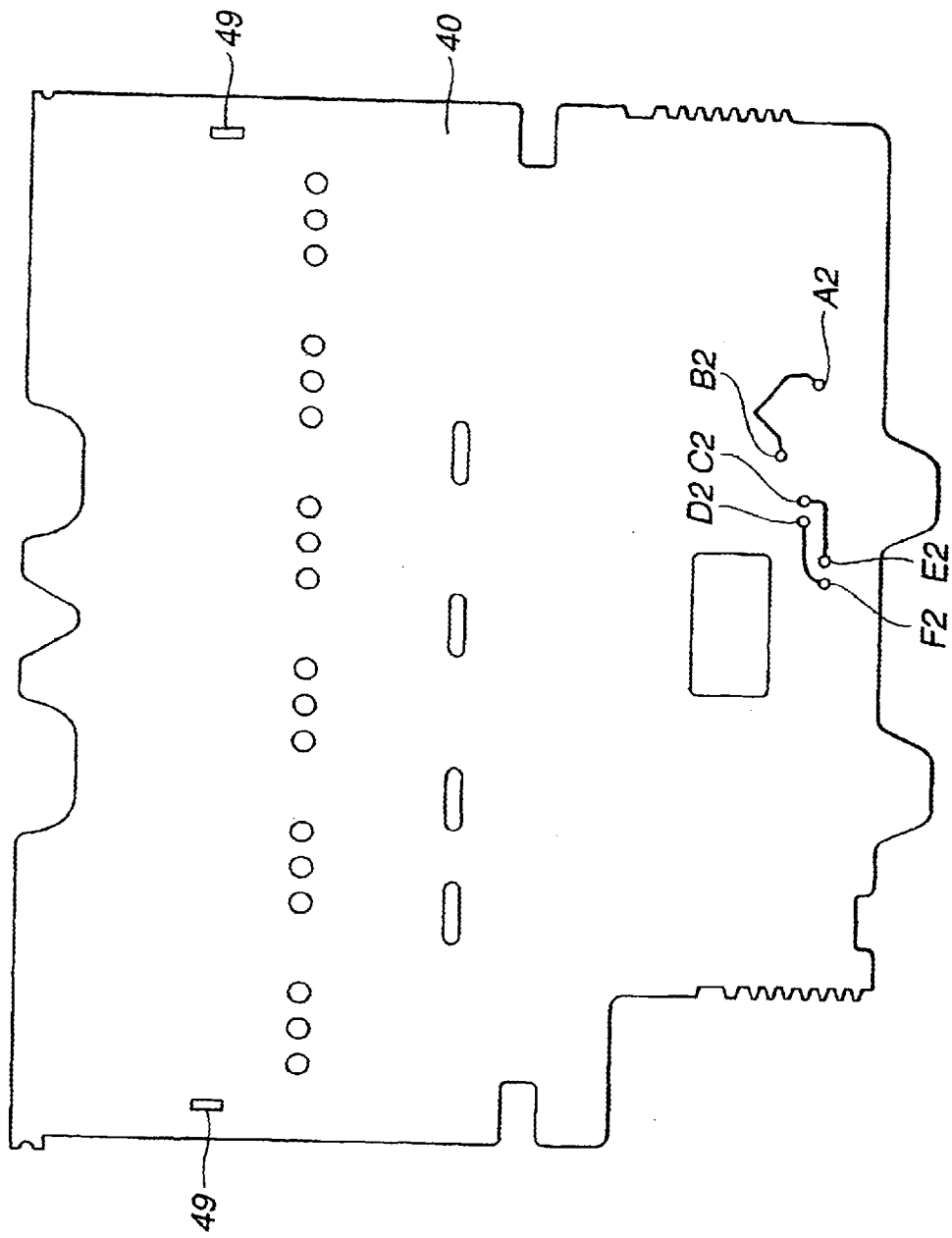
FIG. 5 is a plan view showing a lower side of the essential part of the electric circuit board.

The wiring patterns connecting each of the Hall effect devices 43 and the control IC 42 are provided in preference to the other wiring patterns, so that the distance between the pair of the wiring patterns for connecting each Hall effect device 43 and the control IC 42 is set to be smaller than 1 mm. Therefore, the pairs of the wiring patterns are arranged in parallel as shown in FIGS. 4 and 5 so as not to deviate the distance between the wiring patterns. FIG. 4 is a plan view showing a lower side of an essential part of the electric circuit board 40, and FIG. 5 is a plan view showing an upper side of the essential part of the electric circuit board 40. Points A1, B1, C1, D1, E1 and F1 shown in FIG. 4 are connected with points A2, B2, C2, D2, E2 and F2 of FIG. 5, respectively, through through-holes.

Further, it is preferable to shorten the length of the pair of the wiring patterns for connecting each of the Hall effect devices 43 and the control IC 42 as possible, in order to suppress the influence of the disturbance radio waves to the detection signals of the Hall effect devices 43. That is, by shortening the length of the pair of the wiring patterns, the areas for receiving the disturbance radio waves are decreased, and therefore the overlap of the noises to the detection signal is also decreased.

Therefore, the brushless motor 1 according to the present invention is arranged such that the wiring patterns for connecting each Hall effect device 43 and the control IC 42 are provided in preference to the other wiring patterns formed in the electric circuit board 40 and are shortened as possible.

Further, it is preferable so as not to locate the other wiring patterns between the pair of wiring patterns for connecting each Hall effect device 43 and the control IC 42, in view of suppressing the influence of the disturbance radio waves to the detection signals of the Hall effect devices 43.

Therefore, the brushless motor 1 according to the present invention is arranged such that wiring patterns for connecting each Hall effect device 43 and the control IC 42 are provided in preference to the other wiring patterns formed in the electric circuit board 40 and are arranged so as not to locate the other wiring patterns between the pair of wiring patterns for connecting each Hall effect device 43 and the control IC 42.

Further, the capacitor 47 for reducing the noises overlapped on the detection signals of the Hall effect devices 43 is disposed between the Hall effect devices 43 and the control IC 42. More specifically, the capacitor 47 is disposed in the vicinity of an intermediate portion between each Hall effect device 43 and the control IC 42. This arrangement of the capacitor 47 is preferable in view of reduction of the noises of the signals since the capacitor 47 arranged as mentioned above effectively functions to decrease the noise overlapped on the signal of each Hall effect device 43.

Therefore, the brushless motor 1 according to the present invention is arranged such that wiring patterns for connecting each Hall effect device 43 and the control IC 42 are provided in preference to the other wiring patterns formed in the electric circuit board 40 and that the capacitor 47 for decreasing noises is disposed in the vicinity of an intermediate portion between each Hall effect device 43 and the control IC 42 as possible.

Since the brushless motor 1 according to the present invention is arranged such that the noises to the signals of the Hall effect devices 43 are suppressed by various particular arrangements, it is possible that the control IC 42 properly controls the switching timing of the switching devices 41 on the basis of the detection signal of each Hall effect device 43. This enables the rotational operation of the rotor 3 to be accurately controlled. Further, since it is not necessary to employ any special parts for suppressing the influence of the disturbance radio waves, there is no increase in the number of the parts of the brushless motor 1. Furthermore, since it is not necessary to employ a special Hall effect device which performs a high detection sensitivity, it becomes possible to ensure the suitable rotation control without increasing the cost of parts of the brushless motor 1.

Figure 6:
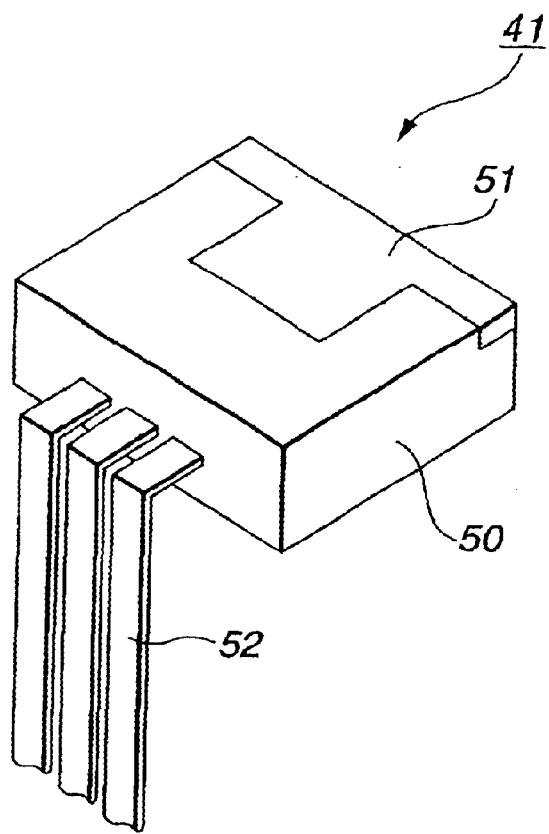
FIG. 6 is a perspective view showing a switching device employed in the brushless motor.

As shown in FIG. 6, the switching devices 41 are for switching the direction of the current supplied to the exciting coils 7 of the stator 7, and are of MOS-FET (field-effect modified) transistor of an exposure type. This FET transistor acting as the switching device 41 is constructed such that a lead flame 51 is exposed from a resin mold portion 50. Further, a MOS-FET transistor of a covered type may be employed as a switching device 41.

Terminals 52 of each switching device 41 are bent perpendicularly at a near portion to the resin mold portion 50 as shown in FIG. 6. Further, free end portions of the terminals 52 are inserted to predetermined positions of the electric circuit board 40 and are electrically connected with the electric circuit board 40 by means of soldered connection.

The resin mold portion 50 of each switching device 41 is pushed by a pressing member 60 so that the lead frame 51 exposed at the resin mold portion 50 is pressed to and fitted with a heat sink 70. Since there is provided an insulative and heat-conductive sheet (not shown) between the switching devices 41 and the heat sink 70, the electrical insulation between the switching device 41 and the heat sink 70 is ensured thereby and only the heat generated by the switching devices 41 is transferred through the insulative and heat-conductive sheet to the heat sink 70.

Figure 7:
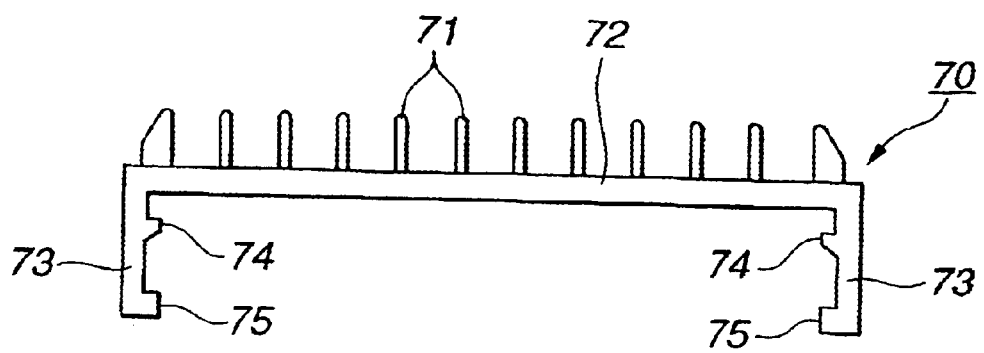
FIG. 7 is a front view of a heat sink employed in the brushless motor.
Figure 8:
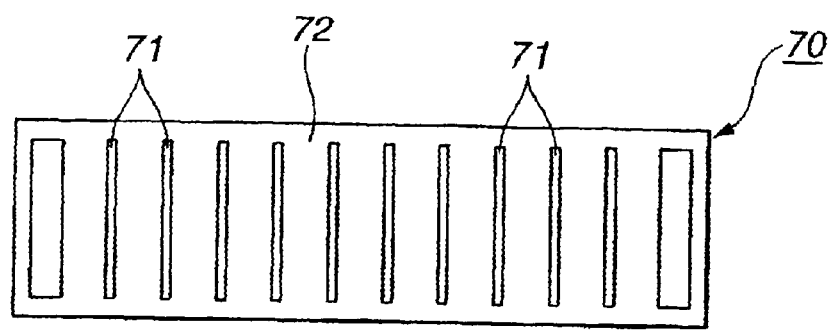
FIG. 8 is a plan view of the heat sink.

As shown in FIGS. 7 and 8, the heat sink 70 is formed into a channel shape and is constituted by a laterally-extending radiating portion 72 which has a plurality of radiating fins 71, and a pair of supporting legs 73 which perpendicularly extend from the lateral both end portions of the radiating portion 72.

A positioning projection 74 for suppressing misregistration of the switching devices 41 relative to the heat sink 70 and a connecting projection 75 for connecting the heat sink 70 and the pressing member 60 project form an inside surface of each of the supporting legs 73 inwardly.

Figure 9:
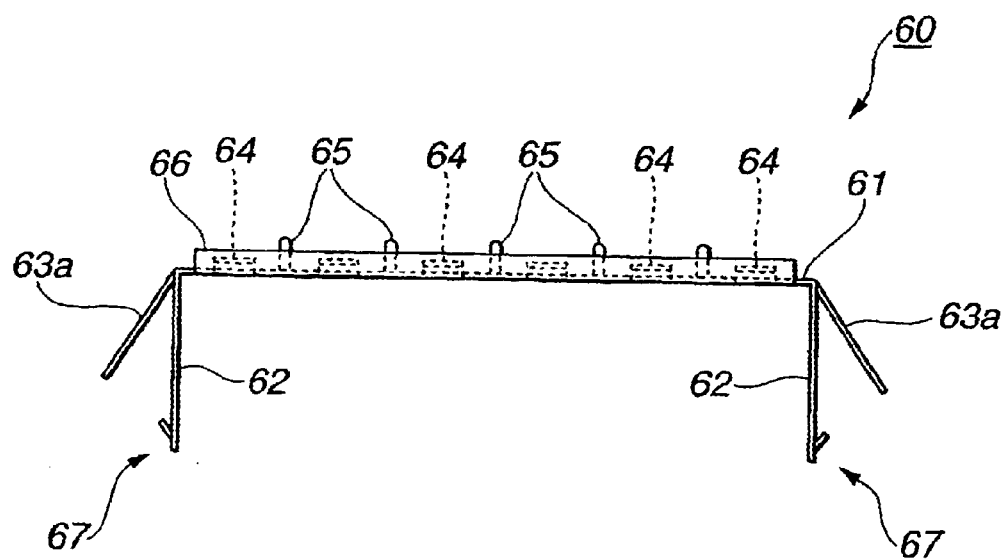
FIG. 9 is a front view of a pressing member employed in the brushless motor.
Figure 10:
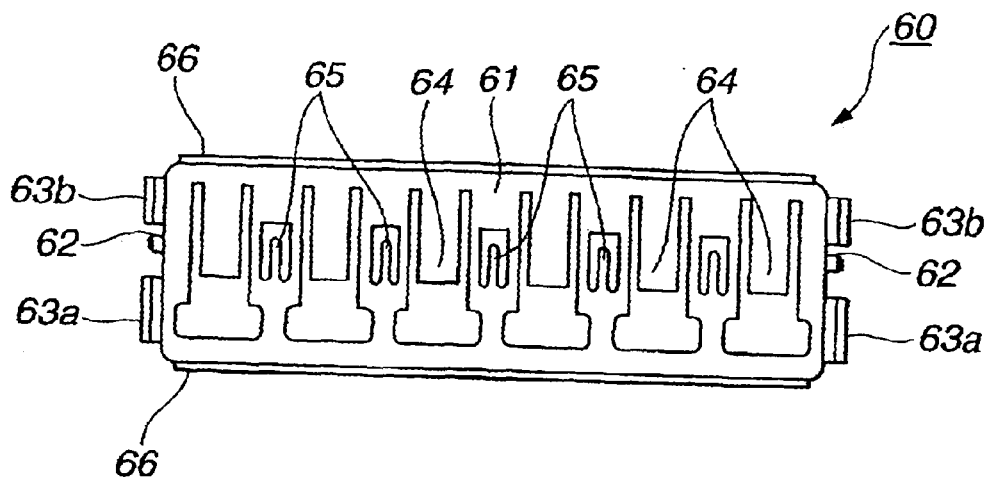
FIG. 10 is a plan view of the pressing member.
Figure 11:
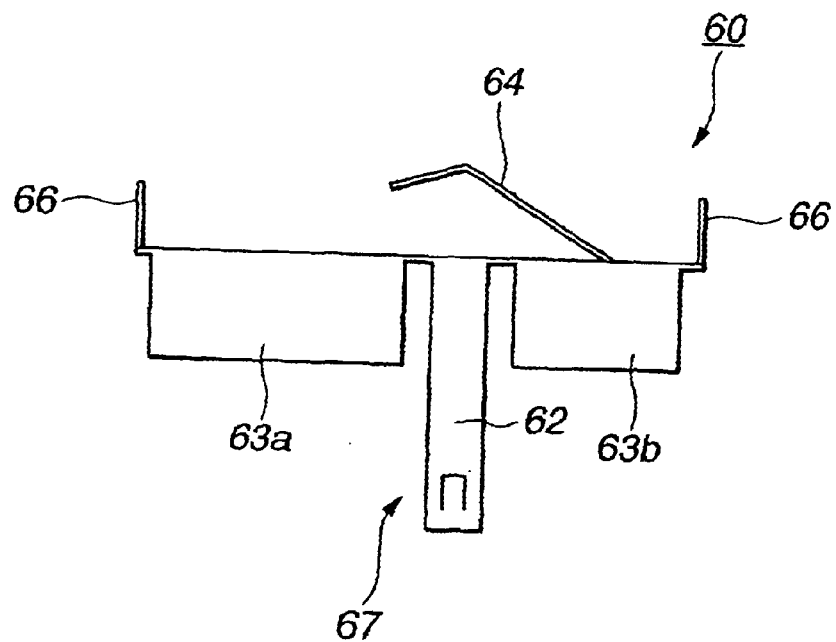
FIG. 11 is a side view of the pressing member.

The pressing member 60 is made by blanking plate-spring material into a predetermined shape and by bending predetermined positions of a member of the predetermined shape. As shown in FIGS. 9 through 11, the pressing member 60 comprises a pressing portion 61 which laterally extends corresponding to the radiating portion 72 of the heat sink 70, a pair of positioning portions 62 which project from both end portions of the pressing portion 61, and connecting pieces 63*a* and 63*b* which outwardly extend from end portions of the positioning portions 62.

A plurality of spring pieces 64 are provided laterally in the pressing portion 61 at predetermined intervals corresponding to the arrangement of the switching devices 41. The spring pieces 64 are upwardly bent from the pressing portion 61 as shown in FIG. 11 so as to push the switching devices 41 to the heat sink 70. A plurality of positioning pieces 65 are provided between the spring pieces 64 in the pressing portion 61 so as to restrict the position of each switching device 41.

A pair of surrounding walls 66 are provided at front and rear longitudinal peripheries of the pressing portion 61 upwardly as shown in FIGS. 10 and 11. The surrounding walls 66 improve the rigidity of the pressing portion 61 and function as a shielding board for shielding noises to the switching devices 41.

Figure 12:
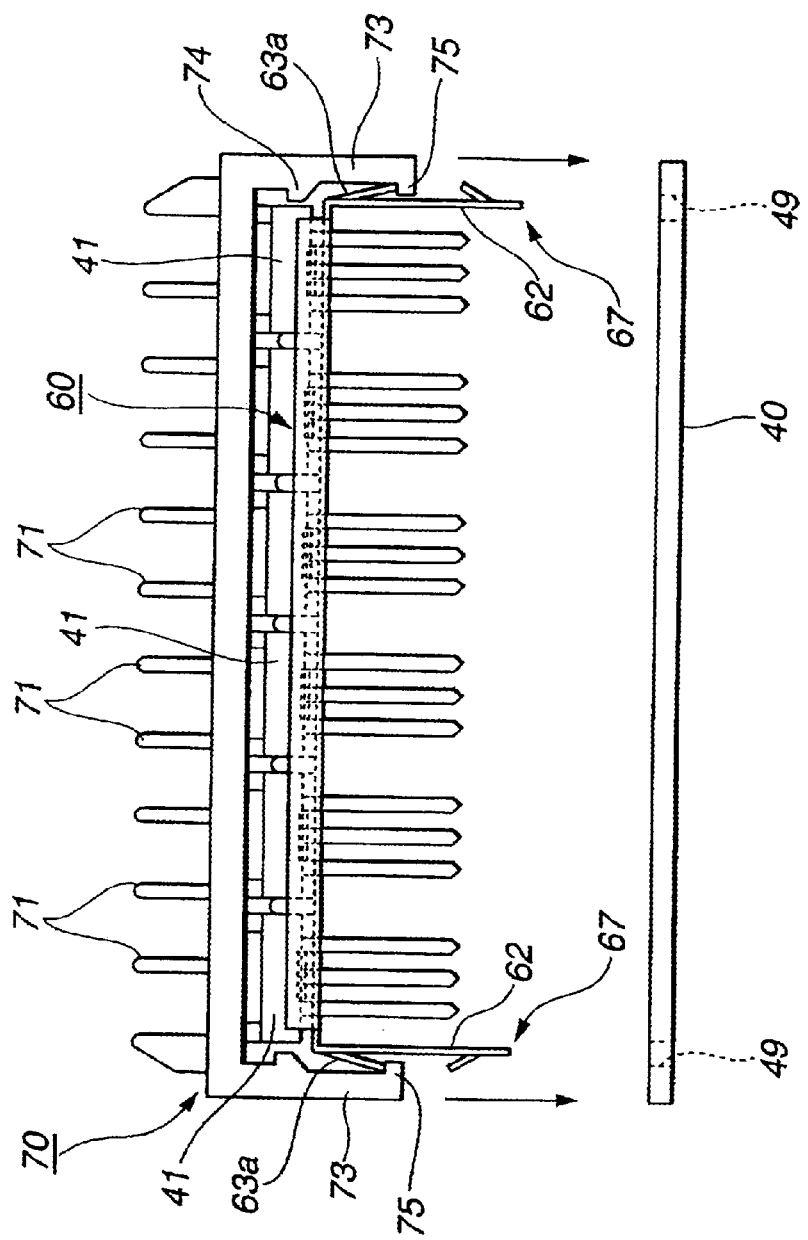
FIG. 12 is a front view showing a connected condition between the pressing member and the heat sink.

As shown in FIG. 12, the pressing member 60 supports the switching devices 41 by means of the spring pieces 64 of the pressing portion 56, and is then located opposite to the inner surface of the heat sink 70 so that the pressing member 60 is surrounded by the supporting legs 73 and the radiating portion 71 of the heat sink 70. The connecting pieces 63a and 63b formed at both end portions of the pressing portion 61 are hung on the connecting projections 75 of the heat sink 70, so that the pressing member 60 is connected with the heat sink 70. Under this connected condition of the pressing member 60 and the heat sink 70, the spring pieces 64 of the pressing portion 61 are elastically deformed in the downward direction, and therefore bias the switching devices 41 to the radiating portion 71 of the heat sink 70. Accordingly, the switching devices 41 are pressingly contacted with the radiating portion 71 of the heat sink 70.

Figure 13:
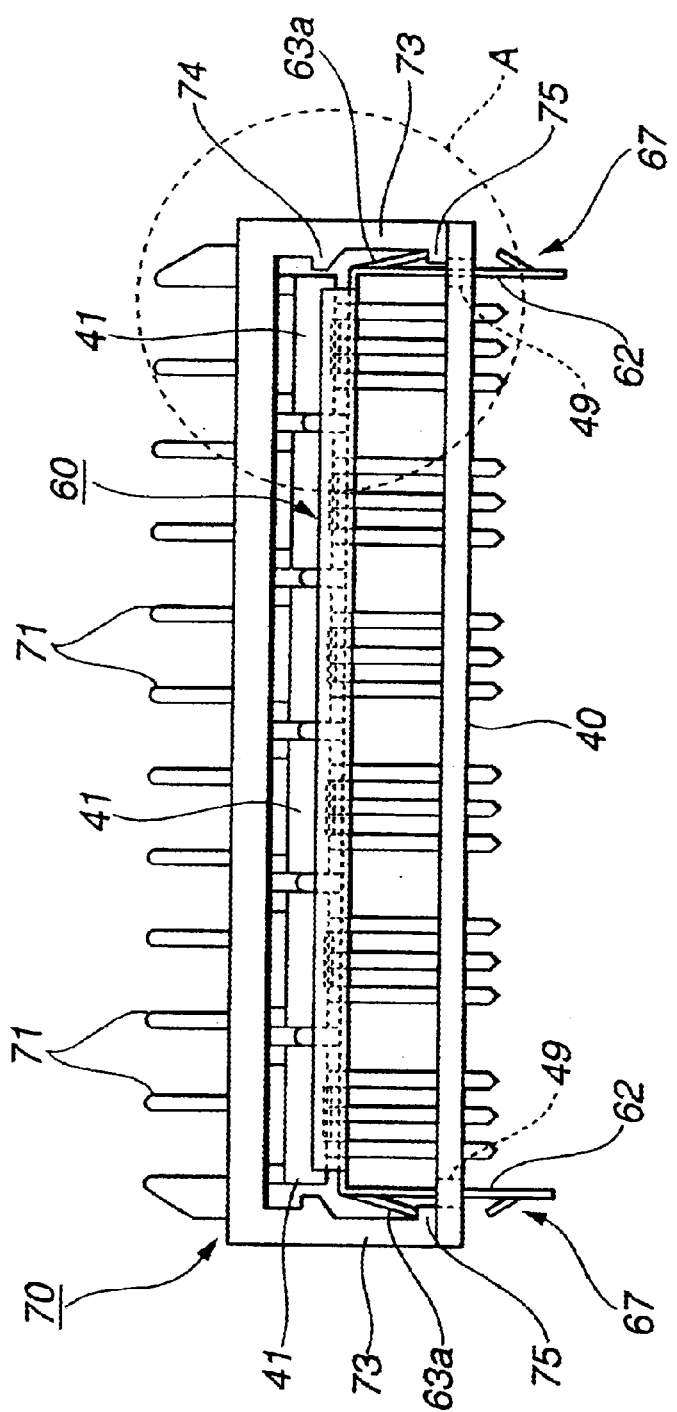
FIG. 13 is a front view showing a fixed condition of the pressing member and the heat sink to the electric circuit board.
Figure 14:
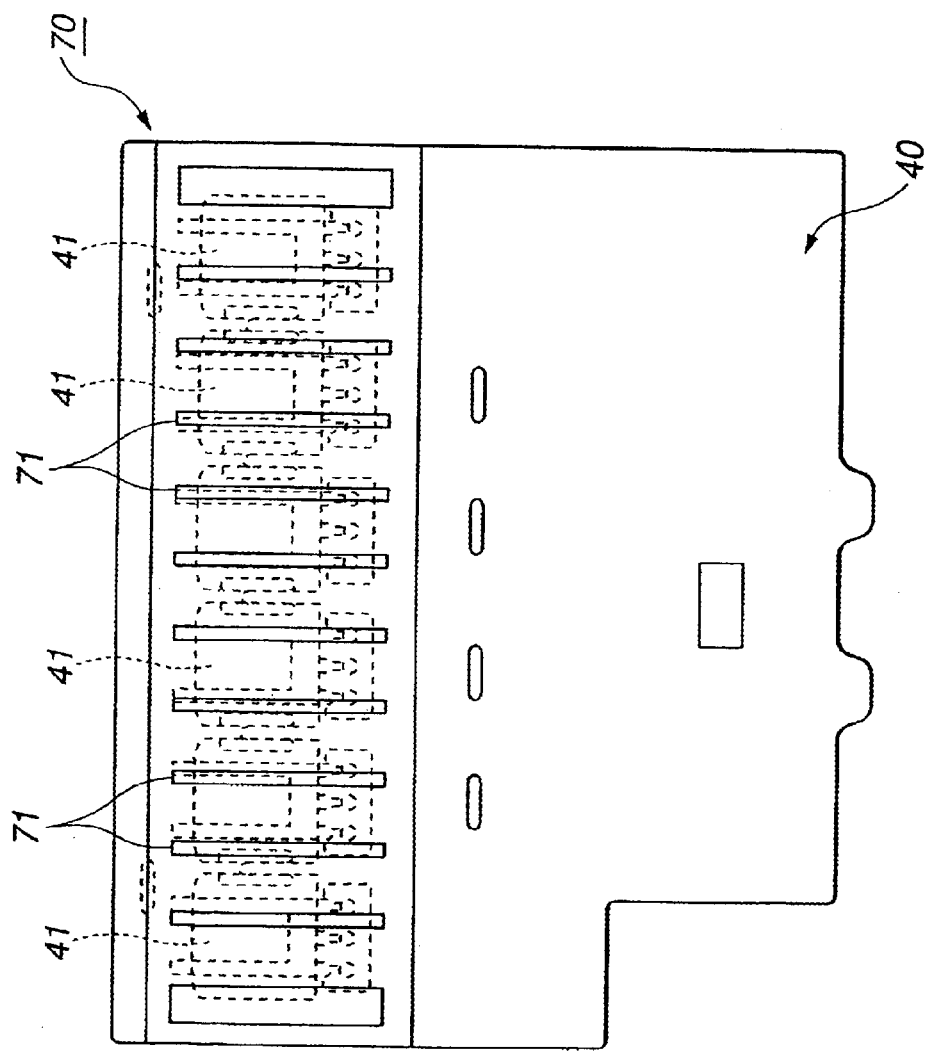
FIG. 14 is a plan view showing the fixing condition of the pressing member and the heat sink to the electric circuit board.
Figure 15:
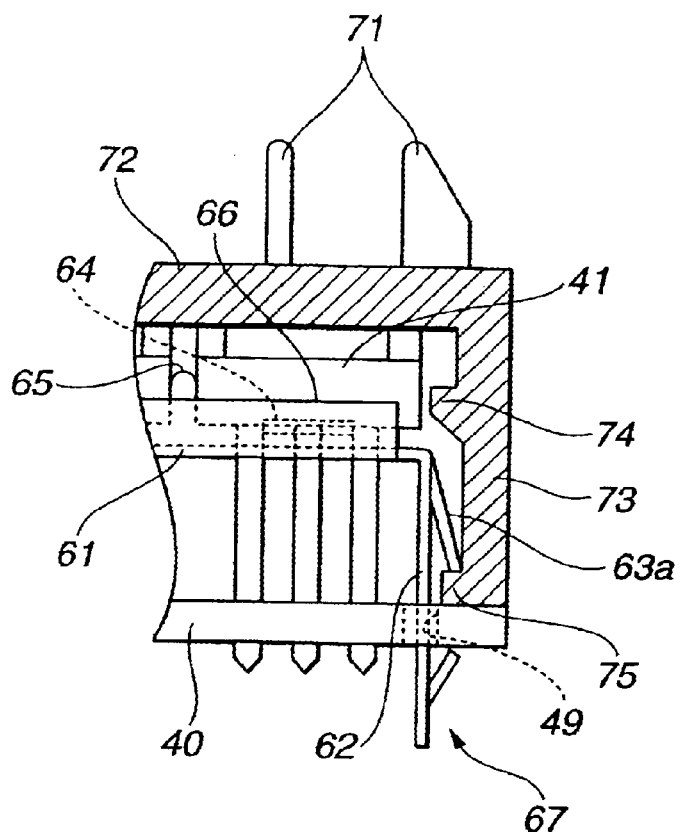
FIG. 15 is an enlarged view of a portion A surrounded by a dotted line in FIG. 13.

As shown in FIGS. 13 through 15, lower end portions of the pair of supporting legs 73 are in contact with the electric circuit board 40 while being connected with the pressing member 60 so that the heat sink 70 is disposed on the electric circuit board 40. The radiating fins 72 provided at the radiating portion 72 are exposed to the outside of the circuit protection case 20 through an opening 21a of the upper case 21, as shown in FIG. 1. Further, the pressing member 60 connected with the heat sink 70 is correctly set relative to the electric circuit board 40 by inserting the positioning portions 62 of the pressing member 60 into a pair of through-holes 49 of the electric circuit board 40.

A fixing portion 67 is formed at a free end portion of each of the positioning portions 62 and is hung with the lower surface of the electric circuit board 40 so that the pressing member 60 and the heat sink 70 are fixed to the electric circuit board 40. As shown in FIG. 12, each of the fixing portions 67 is formed by forming an inversed U-shaped slit on the positioning portion 62 and bending a portion defined by the inversed U-shaped slit outwardly.

When solder is applied to the lower surface of the electric circuit board 40, the fixing portions 67 function to receive the solder applied to the through-holes 49 of the electric circuit board 40 and the positioning portions 62.

That is, when the solder is applied to the lower surface of the electric circuit board 40, the solder applied to the through-holes 49 and the neighborhood thereof is supported by the fixing portions 67. Then, by solidifying the solder, the pressing member 60 and the heat sink 70 are fixed at predetermined positions relative to the electric circuit board 40.

Further, the fixing portion 67 has a function of preventing the pressing member 60 and the heat sink 70 from being detached from the electric circuit board 40 when solder is not applied to the lower surface of the electric circuit board 40.

With this installation structure of the brushless motor 1 according to the present invention, it becomes possible to fix the pressing member 60 and the heat sink 70 relative to the electric circuit board 40 while being correctly positioned relative to the electric circuit board 40. This enables the extremely effective installation operation of the pressing member 60 and the heat sink 70, and therefore it becomes possible to lower the production cost of the brushless motor 1.

Further, the solder applied to the through-holes 49 and the neighborhood thereof is supported by and solidified at the fixing portion 67 formed at the free end portion of the positioning portion 62 of the pressing member 60. Therefore, even if the pressing member 60 is made by a material having a weak adhesive property such as stainless steel, the pressing member 60 and the heat sink 70 are properly fixed to the electric circuit board 40 by means of soldering.

Further, this installation structure of the pressing member 60 and the heat sink 70 enables the shape of the pressing member 60 and the heat sink 70 to be formed simply and lightly. Therefore, it is possible to largely decrease the production cost of the brushless motor 1.

It will be understood that the shape of the fixing portions 67 is not limited to the shape shown in FIG. 12 and may be free as far as being arranged such that the freely arranged fixing members can receive solder applied to the through-holes 49, the positioning portions 62 and the neighborhood thereof. For example, the positioning portions 62 may be formed such that a part of the positioning portion 62 located in the through-hole 49 is provided with a cutout portion, a depression or through-hole to which solder is easily supplied to the through-hole and the positioning portion 62. In such a case, the cutout portion, depression or through-hole functions as a fixing member and enables solder to be received in the through-hole 49 and the neighborhood thereof.

Figure 16:
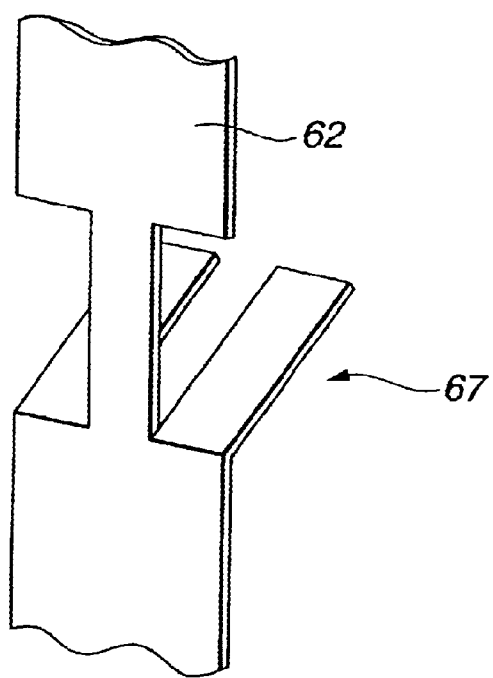
FIG. 16 is an enlarged perspective view showing a modification of the fixing member installed to a positioning piece of the pressing member.

Furthermore, the fixing portion 67 may be formed by forming slits at the right and left side of the positioning portion 62 as shown in FIG. 16 and by bending the slit side areas outwardly.

Generally, the soldering of electric parts to the electric circuit board 40 is executed by a flow soldering method (process). This flow soldering method is executed in a manner of contacting the lower surface of the electric circuit board 40 fed by a conveyer 81 with melted solder of a soldering bath 80 recirculatedly so that the melted solder is attached on predetermined portions of the electric circuit board 40, and is cooled and solidified.

When the soldering of the electric circuit board 40 is executed by the flow soldering method and if a lower end portion of each supporting leg 73 of the heat sink 70 projects from the lower surface of the electric circuit board 40 downwardly, unnecessary or excess solder is attached on the lower end portion of each supporting leg 73. Such attachment of excess solder requires a solder removing operation, and consequently invites the increase of the production steps. Further, if a piece of removed solder is attached on the electric circuit board 40, the control circuit 32 formed on the electric circuit board 40 may operate incorrectly.

However, the brushless motor 1 according to the present invention is arranged such that the heat sink 70 is disposed on the electric circuit board 40 in a condition that the lower end portion of each supporting leg 73 is in contact with the electric circuit board 40 and is fixed to the electric circuit board 40 by means of the fixing portions 67 of the pressing member 60 while keeping the positioning of the heat sink 70 relative to the electric circuit board 40. Accordingly, with this arrangement according to the present invention, the above-discussed problem of unnecessary solder is effectively prevented. Therefore, the brushless motor 1 according to the present invention facilitates the complicated works such as a work for removing unnecessary solder, and prevents an erroneous operation of the control circuit 32, which operation will caused by attaching the unnecessary solder to the electric circuit board 40.

Figure 17:
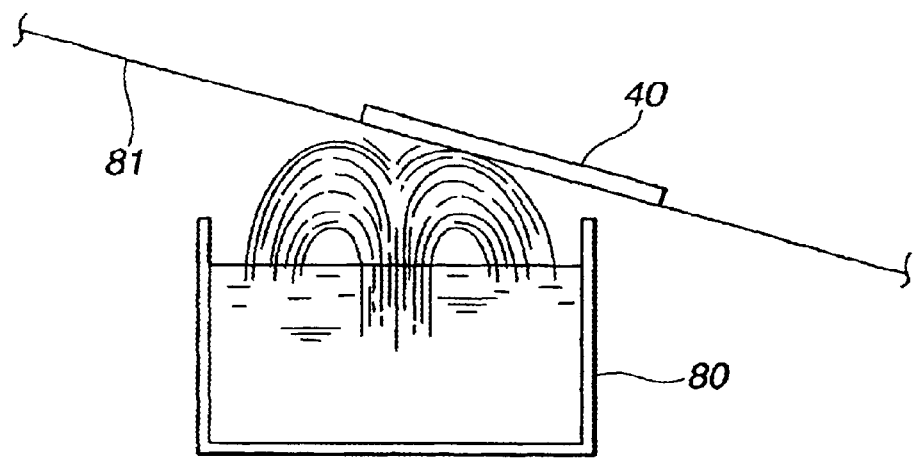
FIG. 17 is a schematic view showing a flow soldering method employed in the production process of the brushless motor.

Further, since the brushless motor 1 according to the present invention prevents problems that temperature in the soldering bath 80 shown in FIG. 17 is lowered by contacting the lower end portions of the supporting legs 73 of the heat sink 70 with the solder in the soldering bath 80 and that the temperature of the heat sink 70 becomes high so as to degrade the heat radiating performance thereof.

Since it is possible to lighten the pressing member 60 and the heat sink 70, the brushless motor 1 according to the present invention effectively suppresses a problem that the electric circuit board 40 with the pressing member 60 and the heat sink 70 sinks in the soldering bath 80.

Furthermore, when the electric parts are installed to the electric circuit board 40 by means of the flow soldering method, even if the supporting legs 73 of the heat sink 70 do not project from the lower side of the electric circuit board 40, there is a possibility that melting solder of the soldering bath 80 scatters on the upper side of the electric circuit board 40 and is attached to the supporting legs 70 of the heat sink 70.

Figure 18:
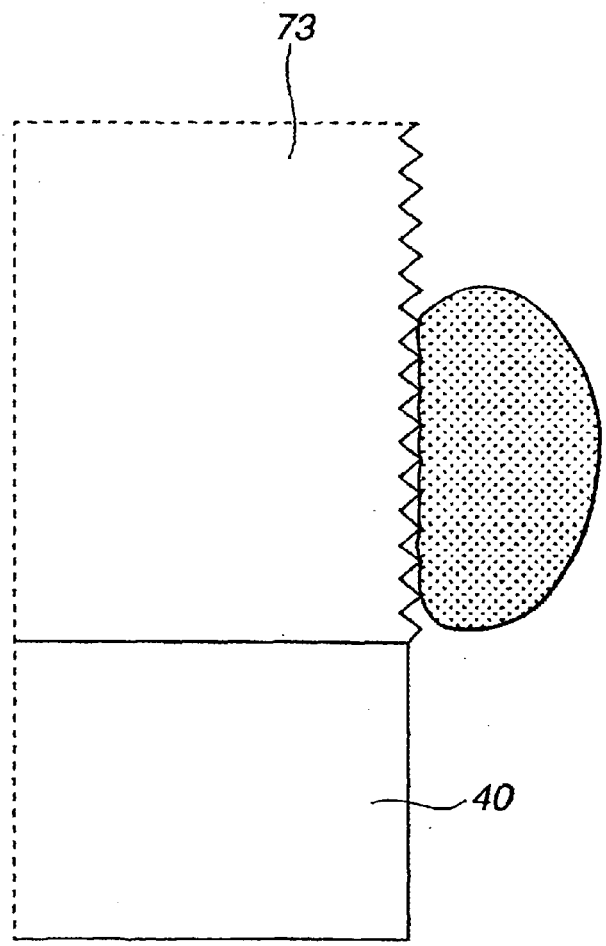
FIG. 18 is a schematic view showing a roughly machined surface of an outer peripheral surface of a supporting leg of the heat sink.

In order to prevent such a problem, the outer peripheral surfaces of the supporting legs 73 of the brushless motor 1 according to the present invention are machined into rough surfaces by means of the rough surface treatment such as knurling or sandblasting, as shown in FIG. 18. With this arrangement of the outer peripheral surfaces of the supporting legs 73, even if the scattered solder is attached on the supporting legs 73, the solder is easily detached from the surfaces, and therefore the fixing of the solder to the supporting legs 73 is effectively suppressed.

The entire contents of Japanese Patent Application No. 2000-383933 filed on Dec. 18, 2000 in Japan are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A brushless motor comprising:
   a stator comprising a plurality of exciting coils;
   a rotor rotatable relative to the stator;
   an electric circuit board comprising a control circuit for controlling rotation of the rotor, the electric circuit board having through-holes;
   a heat sink comprising a heat radiating portion and a pair of supporting legs extending from opposite end portions of the heat radiating portion, the heat sink being disposed on the electric circuit board by contacting an end portion of each of the supporting legs with the electric circuit board;
   a plurality of switching devices electrically connected with the electric circuit board, the switching devices controlling a direction of drive current supplied to exciting coils of the stator; and
   a pressing member comprising a pressing portion, a pair of positioning portions extending respectively from opposite end portions of the pressing portion, and a pair of connecting portions projecting respectively from the pair of positioning portions respectively, the pressing portion pressing the switching devices to the heat sink by engaging the connecting portions with the heat sink, the positioning portions being inserted into the through-holes of the electric circuit board respectively, wherein the pressing member further comprises a pair of fixing portions which are formed at free end portions of the positioning portions, and the fixing portions are hung with a lower surface of the electric circuit board.

2. The brushless motor as claimed in claim 1, wherein each of the positioning portions of the pressing member has a fixing member for fixing the pressing member and the heat sink to the electric circuit board.

3. The brushless motor as claimed in claim 2, wherein the fixing member receives solder supplied to the through-hole and the positioning member.

4. The brushless motor as claimed in claim 1, wherein each of the supporting legs of the heat sink comprises a positioning projection for suppressing misregistration of the switching devices relative to the heat sink and a connecting projection for connecting the heat sink and the pressing member, the positioning projection and the connecting projection project form an inside surface of each of the supporting legs inwardly.

5. The brushless motor as claimed in claim 1, wherein the fixing portion is formed by forming an inversed U-shaped slit on the positioning portion and bending a portion defined by the inversed U-shaped portion outwardly.

6. The brushless motor as claimed in claim 1, wherein the fixing portion is formed by forming slit at right and left sides of each positioning portion and by bending side parts defined by the slits outwardly.

7. The brushless motor as claimed in claim 1, wherein the positioning portions of the pressing member are formed such that a part of each positioning portion located in the through-hole is provided with one of a cutout, a depression and a through-hole so that solder is easily supplied to the through-hole of the electric circuit board and the positioning portion.

8. The brushless motor as claimed in claim 1, wherein the pressing member further comprises a plurality of spring pieces which are provided laterally in the pressing portion of the pressing member and which are upwardly bent from the pressing portion so as to push the switching devices to the heat sink.

9. The brushless motor as claimed in claim 5, wherein the pressing member further comprises a plurality of positioning pieces which are provided between the spring pieces so as to restrict positions of the switching devices.

10. The brushless motor as claimed in claim 1, wherein a pair of surrounding wall are provided and front and rear longitudinal peripheries of the pressing portion of the pressing member so as to improve rigidity of the pressing portion and to function as a shielding board for shielding noises to the switching devices.

11. The brushless motor as claimed in claim 1, wherein the heat radiating portion of the heat sink includes a plurality of fins.

12. The brushless motor as claimed in claim 1, wherein each of the switching devices has a plurality of terminals which are perpendicularly bent at a near portion to a transistor of the switching device, and free end portions of the terminals are inserted to predetermined positions of the electric circuit board and are electrically connected with the electric circuit board by means of soldering.

13. The brushless motor as claimed in claim 1, wherein the pressing member is made by blanking plate-spring material into a predetermined shape and by bending predetermined portions of a member of the predetermined shape.

14. The brushless motor as claimed in claim 1, wherein the fixing portions receive solder applied to the through-holes and the positioning portions.

15. The brushless motor as claimed in claim 1, wherein the fixing portions receive solder applied to the through-holes and the positioning portions.

16. The brushless motor as claimed in claim 1, wherein outer surfaces of the supporting legs of the heat sink are machined into rough surfaces so that solder attached on the outer surfaces is easily detached.

17. The brushless motor as claimed in claim 1, wherein outer surfaces of the supporting legs of the heat sink are machined into rough surfaces by means of one of knurling and sandblasting.

18. The brushless motor as claimed in claim 1, wherein the positioning portions are inserted into the through-holes of the electric circuit board respectively so that the pressing member and the heat sink are located at predetermined positions relative to the electric circuit board.

19. An assembly structure of a brushless motor, comprising:
- a circuit board comprising a control circuit for controlling a rotation of a rotor relative to a stator of the brushless motor and through-holes;
- a heat sink comprising a heat radiating portion and a pair of supporting legs extending from opposite sides of the heat radiating portion, a free end portion of each supporting leg being in contact with the electric circuit board;
- a plurality of switching devices electrically connected with the electric circuit board, the switching devices controlling a direction of drive current supplied to exciting coils of the stator; and
- a pressing member comprising a pressing portion, a pair of positioning portions perpendicularly extending from opposite end portions of the pressing portion, and a pair of connecting portions projecting from the pair of positioning portions respectively, the connecting portions being engaged with the supporting legs respectively, the pressing portion pressing the switching devices to the heat sink, the positioning portions being inserted into the through-holes of the electric circuit board respectively, wherein the pressing member further comprises a pair of fixing portions which are formed at free end portions of the positioning portions, and the fixing portions are hung with a lower surface of the electric circuit board.

* * * * *